United States Patent [19]

Davy et al.

[11] 4,405,279

[45] Sep. 20, 1983

[54] TAILGATE LOADER

[75] Inventors: Robert F. Davy; Wilhelm K. Kremp, both of Scarborough, Canada

[73] Assignee: Robert F. Davy, Scarborough, Canada

[21] Appl. No.: 293,842

[22] Filed: Aug. 18, 1981

[51] Int. Cl.³ ............................................. B60P 1/44
[52] U.S. Cl. ..................................... 414/558; 414/546
[58] Field of Search ......................... 414/546, 556-558

[56] References Cited

U.S. PATENT DOCUMENTS 3,369,678 2/1968 Robinson .......................... 414/558
3,498,481 3/1970 Size .................................. 414/558

Primary Examiner—Robert G. Sheridan
Attorney, Agent, or Firm—Sim & McBurney

[57] ABSTRACT

A tailgate loader for a vehicle such as a truck. The loader includes an upper arm and a lower arm, both pivoted at one end to the rear of the vehicle, and both swingable in a vertical plane. The arms are in parallelogram linkage, and a platform is mounted on the short rearward arm of the parallelogram, so that it can swing between a stored position in which it overlies the upper arm, and an extended position in which it projects rearwardly from the upper arm. A hydraulic device is provided for swinging the arms about their pivot locations, and an opener assembly is provided for raising the platform from the stored position to a near-vertical position as the two arms swing downwardly about their pivot locations. The opener assembly includes a first connecting link pivoted at one end to the upper arm at a location spaced a first distance from the other end thereof, and a second connecting link pivoted to one end to the lower arm at a location spaced a second distance from the other end of the lower arm, the second distance being greater than the first distance. The other ends of the first and second connecting links are pivotally connected together to form a knuckle. As the arms are lowered, the knuckle moves away from the upper arm, thus pressing on and moving the platform toward a vertical position, so that the operator need not exert great force to swing the platform to its extended position.

9 Claims, 5 Drawing Figures

TAILGATE LOADER

This invention relates generally to tailgate loaders for vehicles such as trucks, and has to do particularly with a tailgate loader having improved characteristics over those known in the prior art.

BACKGROUND OF THIS INVENTION

Tailgate loaders are generally known, in which a parallelogram linkage connected between a portion of the chassis at the rear of a truck and a platform is adapted to raise and lower the platform in such a way that the platform remains horizontal or substantially so. The raising and lowering is typically accomplished hydraulically, with a hydraulic cylinder being connected in such a way that it can be used to change the length of a diagonal of the parallelogram, thus causing the rear portion of the parallelogram linkage to move either up or down. In a typical installation, the power would be applied in order to raise the platform, and gravity would be used to lower the platform.

The platforms of tailgate loaders are typically stored either in a vertical position, in which they rest up against the back doors of the truck, or in a stored position under the rear upper chassis of the truck. This invention relates to arrangements in which the platform can be stored under the upper chassis at the rear of the truck.

Typically, the platform is pivotally mounted to what constitutes a vertical link at the rear end of the parallelogram linkage. The platform is ordinarily constructed in such a way that it can, while extending rearwardly from the parallelogram linkage, only pivot downwardly to a given predetermined position, typically one in which it is approximately parallel with the ground (horizontal). Further pivoting of the frame is prevented by mechanical interference between a flange or bracket and the rearward vertical link of the parallelogram linkage. To place the platform in a stored position, the platform is swung upwardly, through the vertical "dead centre" position, and then inwardly and downwardly to overlie the parallelogram linkage itself.

Generally, the platforms utilized in tailgate loaders are quite heavy, and it is an aspect of this invention to provide a tailgate loader construction which is such that it does not require great effort on the part of the operator to move the platform from the stored position to the extended position.

GENERAL DESCRIPTION OF THIS INVENTION

This invention applies to a tailgate loader for a vehicle which comprises a parallelogram linkage between the rear of a vehicle and a substantially vertical link adapted to be raised and lowered with respect to the vehicle as power means alter the length of a diagonal of the parallelogram linkage. The loader includes a platform mounted for pivotal movement about the vertical link between a stored position in which it overlies the parallelogram linkage and an extended position in which it projects rearwardly from the linkage. The linkage has upper and lower arms. This invention provides the improvement which comprises an opener assembly for raising the platform from the stored position to a near-vertical position as the parallelogram linkage swings downwardly. The opener assembly includes (a) a first connecting link pivoted at one end to the upper arm at a location spaced a first distance from the rear end of the upper arm, and (b) a second connecting link pivoted at one end to said lower arm at a location spaced a second distance from the rear end of the lower arm. The second distance is greater than the first distance, and the other ends of the connecting links are pivotally connected together to form a knuckle. In this manner, as the parallelogram linkage is lowered, the knuckle moves the platform toward a vertical position, so that the operator need not exert great force to swing the platform to its extended position.

GENERAL DESCRIPTION OF THE DRAWINGS

One embodiment of this invention is illustrated in the accompanying drawings, in which like numerals denote like parts throughout the several views, and in which.

DETAILED DESCRIPTION OF THE DRAWINGS

Figure 1:
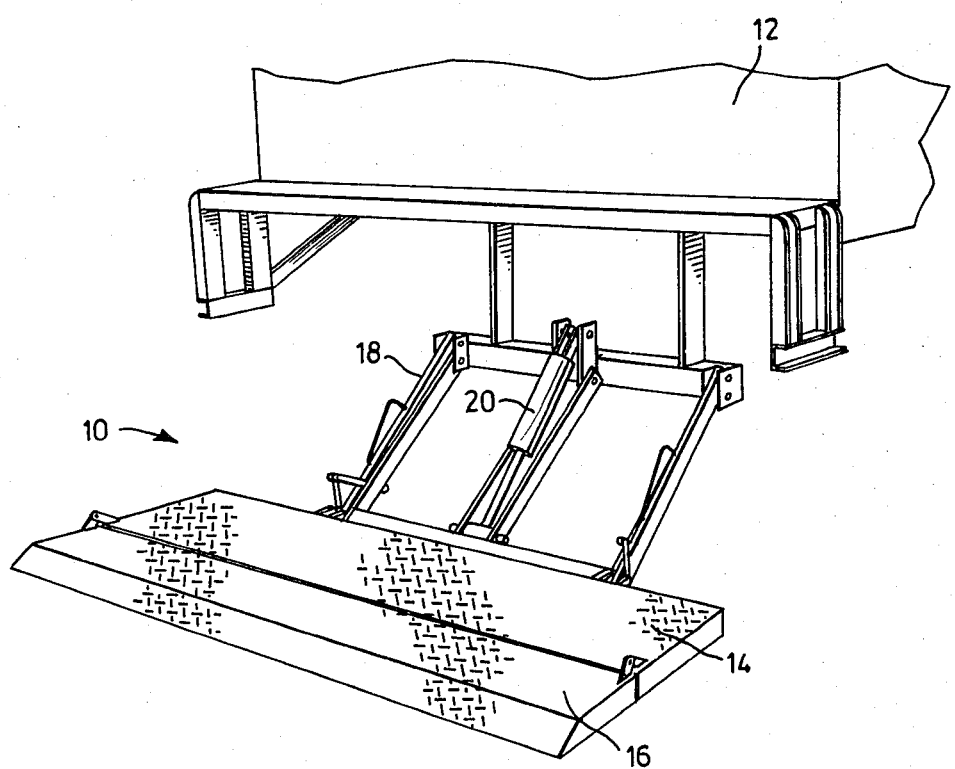
FIG. 1 is a perspective view of a tailgate loader constructed in accordance with this invention.

Attention is first directed to FIG. 1 in which a tailgate loader 10 is shown mounted to the rear of a truck 12, only partly seen in the figure.

The tailgate loader 10 includes a platform 14, a flipover plate 16, a parallelogram linkage 18, and power means including a hydraulic cylinder 20 for raising and lowering the parallelogram linkage 18.

Figure 2:
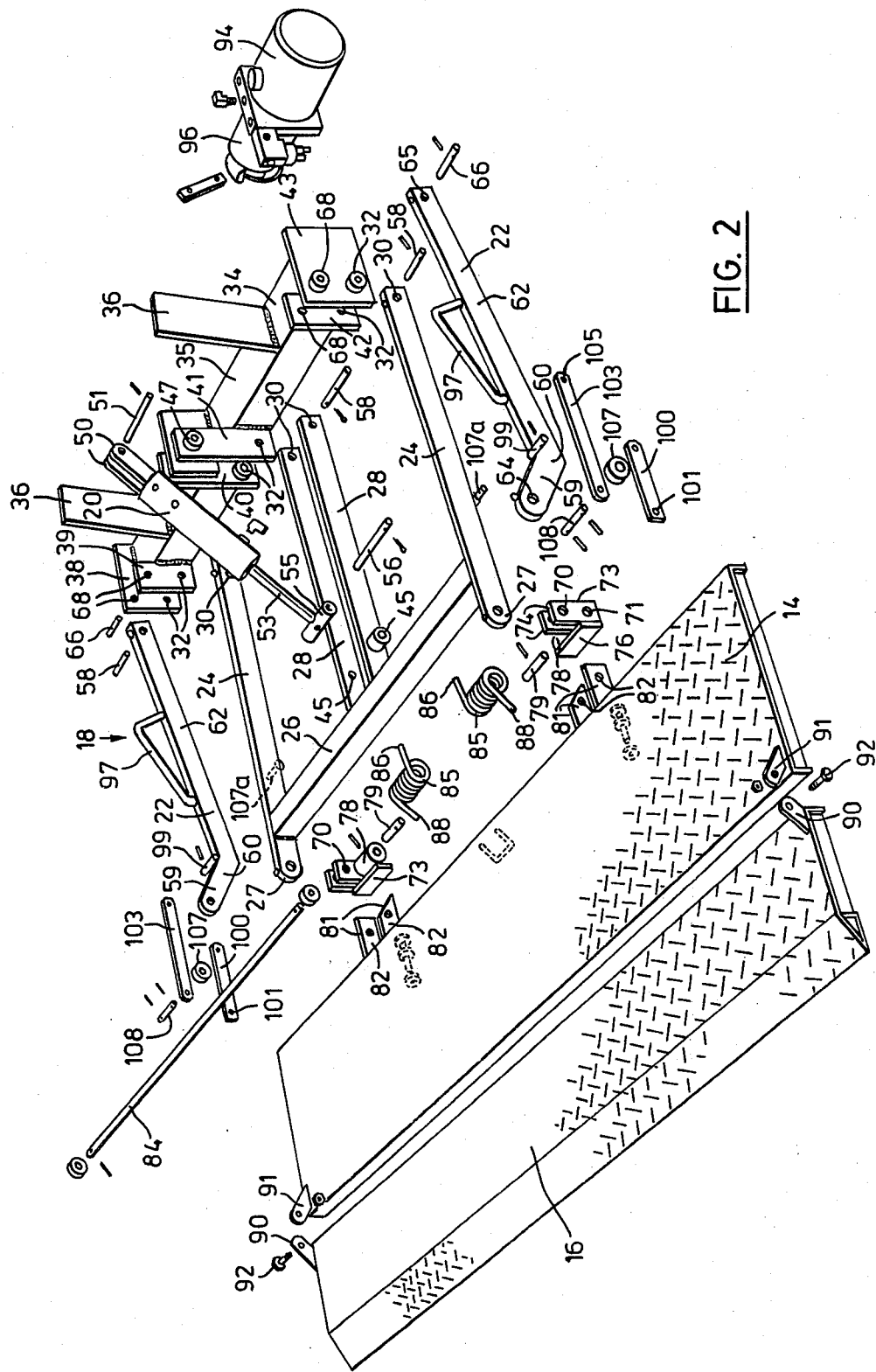
FIG. 2 is an exploded perspective view of the various components of the tailgate loader constructed in accordance with this invention.

Attention is now directed to FIG. 2, with the help of which the assembly shown in FIG. 1 will be described in greater detail.

In FIG. 2, the parallelogram linkage 18 includes two upper arms 22 and two lower arms 24.

The two lower arms 24 are part of a rigid assembly which includes a crosspiece 26 to which the lower arms 24 are welded at a location near their rearward ends 27.

Welded adjacent the centre of the crosspiece 26 are two intermediate parallel arms 28, spaced apart from each other, and extending in parallel with the lower arms 24.

The lower arms 24 and the intermediate arms 28 all have openings 30 at their forward ends (rightward ends at FIG. 2), to allow these arms to be pivotally mounted to respective apertures 32 located on respective brackets extending rearwardly from a main frame assembly 34. The main frame assembly 34 includes a horizontal member 35 supported at the bottom of two upstanding members 36 which are spaced apart along the horizontal member 35, and rearwardly extending brackets 38, 39, 40, 41, 42 and 43. The brackets 38 and 43 are located at the ends of the horizontal member 35.

When the rigid assembly which includes the lower arms 24 has been mounted to pivot about the aligned apertures 32, the movement of the rearward end 27 of the two lower arms 24 establishes the motion of the platform 14. In order to cause the rigid assembly incorporating the lower arms 24 to swing about the aligned apertures 32, the hydraulic cylinder 20 is connected between apertures 45 near the rearward end of the intermediate arms 28 and apertures 47 (only one visible in FIG. 2) near the upper end of the intermediate brackets 40 and 41 on the horizontal member 35. More specifically, the hydraulic cylinder 20 has two rearwardly and upwardly extending mounting brackets 50 with apertures adapted to receive a mounting pin 51, with the pin 51 also passing through the apertures 47. The hydraulic cylinder 20 has a piston 53 to the outward end of which is connected a hollow cylindrical member 55 adapted to be positioned between the intermediate arms 28, and to receive a pin 56 also passing through the apertures 45. Pins 58 are provided to pivotally mount the rigid assembly including the lower arms 24 with respect to the main frame assembly 34.

The parallelogram linkage 18 also includes the upper arms 22, and in FIG. 2 each of these is seen to be a member which includes a V-shaped bend adjacent its rearward or leftward end. In greater detail, each upper arm 22 includes a rearward portion 59, the apex 60 of a V-shaped bend, and a forward portion 62 which is considerably longer than the rearward portion 59. Each upper arm 22 has a rearward aperture 64 and a forward aperture 65. Pins 66 are provided to mount the upper arms 22 to the main frame assembly 34 through apertures 68 in the brackets 38, 39, 42 and 43.

At their rearward ends, the upper arms 22 and the lower arms 24 are adapted to be pivotally mounted in apertures 70 and 71, respectively, in two vertical links 73.

More particularly, each vertical link 73 includes two upstanding rectangular plates 74 through which the apertures 70 and 71 are aligned, a further rectangular plate 76 to which the plates 74 are welded in order to establish the spacing between them, and a cylindrical bearing 78 adapted to receive a pin 79. The cylindrical bearing 78 is continuous with and parallels the aperture 71. The apertures in the rearward ends 27 of the lower arms 24 are adapted to be pivoted in the apertures 71 of the vertical links 73, utilizing the pins 79. More particularly, each lower arm 24 is positioned to the inside of its respective vertical length 73, so that the aperture in the rearward end 27 of each lower arm is applied against the inner end of the respective bearing 78.

In order to mount to upper arms 22, the aperture 64 in the rearward end of each upper arm 22 is placed between the respective pair of locks 74 so that it is in alignment with the apertures 70, and the two pairs of forwardly extending tabs 81 are positioned to enclose the respective pairs of plates 74, with the apertures 82 in alignment with the apertures 70. Then, a rod 84 is threaded through all of these apertures, and through two torsion springs 85. Each torsion spring 85 has one arm extending forwardly, so that it is able to press againt the crosspiece 26, and one arm 88 extending rearwardly so that it can press against the forward margin of the platform 14. The torsion springs 85 act to urge the platform 14 in the clockwise direction about the rod 84 (as pictured in FIG. 2), although the force exerted by the springs 85 is not enough to overcome the gravitational weight of the platform 14 and the flipover plate 16. Together, these latter two items more than counterbalance the urging of the springs 85, the difference being small enough that an operator can easily raise the platform 14 up to a through the vertical "dead centre" position, without exerting an undue amount of force.

As can be seen at the left in FIG. 2, the flipover plate 16 has two oblique brackets 90 at either end, and the platform 14 has two oblique brackets 91 at either end. All of the brackets have apertures, and bolts 92 are used to constitute pivot members defining an axis about which the flipover plate 16 can pivot with respect to the platform 14.

Shown at the far right in FIG. 2 is an electrical motor 94 adapted to operate a hydraulic pump 96 in order to operate the hydraulic cylinder 20. The hydraulic lines connecting the pump 96 with the cylinder 20 have not been illustrated in FIG. 2, to avoid cluttering the figure.

Each of the upper arms 22 has an L-shaped buffer rod 97 securely affixed to its upper edge, in a configuration shown in FIG. 2. Also, each upper arm 22 has affixed to it a horizontal stub shaft 99. A first connecting link 100 is provided for each of the upper arms 22, the first connecting link 100 having an aperture 101 at its rearward end adapted to receive the stub shaft 99. A second connecting link 103 is also provided for each of the upper arms 22, each second connecting link 103 having a forward end aperture 105 adapted to be received over a stub shaft 107a located along the lower edge of each lower arm 24.

The other ends of each pair of connection links 101 and 103 are adapted to be pivoted together with a spacer sleeve 107 in between, using a pin 108.

When assembled, the upper arms 22 lie outboard of the lower arms 24, the connecting links 103 lie between the two arms 22 and 24, and the connecting link 100 lies outboard of the upper arm 22. Thus, the spacer sleeve 107 is located in alignment with the upper arm 22.

Figure 3:
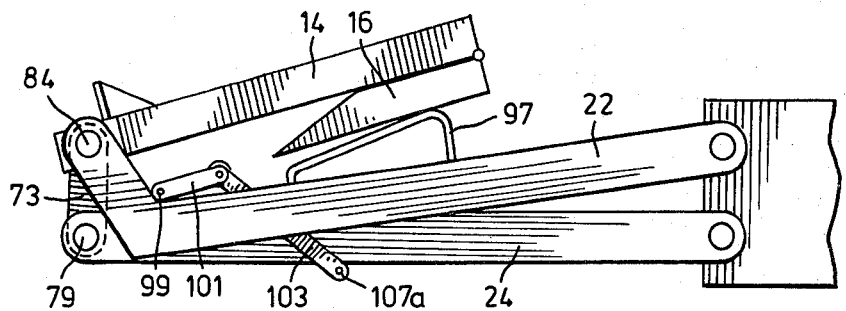
FIGS. 3, 4 and 5 are sequential views in the lowering of the tailgate loader of this invention, showing the operation thereof.
Figure 4:
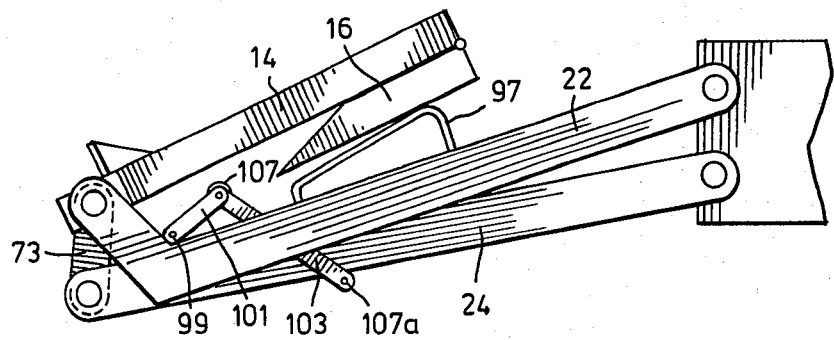
Figure 5:
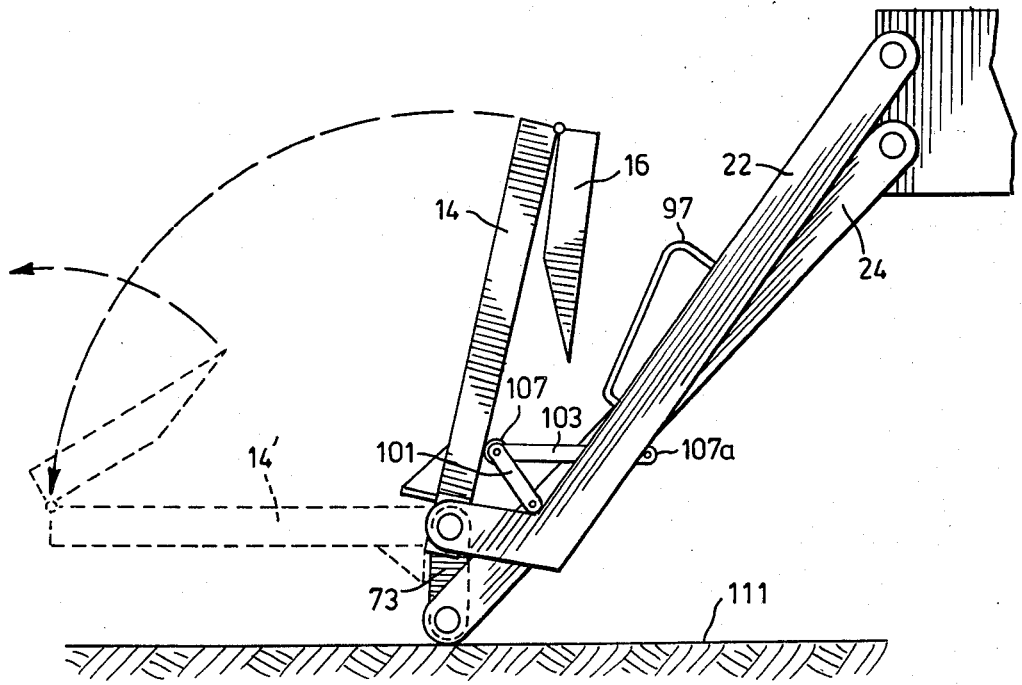

Attention is now directed to FIGS. 3–5, with the aid of which the operation of the major portions of the assembly of FIG. 2 will be described. These figures have been somewhat simplified, to avoid cluttering; hence, components not important to the operation now to be discussed have not been illustrated.

FIG. 3 shows the assembly in a position close to or at its uppermost or raised condition, with the platform 14 and flipover plate 16 in the stored position. As can be seen, in FIG. 3 the platform 14 extends rightwardly (forwardly) over the parallelogram linkage defined by the arms 22 and 24, with the flipover plate 16 folded back against the platform 14. The buffer rod 97 holds the platform and flipover plate 16 away from the upper arm 22. The purpose here is not to protect the upper arm 22, but to allow space for the cylinder 20 (not illustrated in FIG. 3).

FIG. 3 shows that the assembly defined by the connecting links 101 and 103 is out of contact with the platform 14.

Attention is now directed to FIG. 4 which shows the parallelogram linkage defined by the arms 22 and 24 at a somewhat lower position from that of FIG. 3. As can be seen, the platform 14 and the flipover plate 16 still rest against the buffer rod 97, although the knuckle defined by the spacer sleeve 107 has now approached more closely to the platform 14. This is due to the fact that the stub shafts 91 and 107a are now closer together, and the fact that the distance between the stub shaft 107a and the pivot axis defined by the pin 79 is greater than the distance between the stub shaft 99 and the rod 84.

FIG. 5 shows the parallelogram linkage in its lowermost position, with the vertical links 73 resting against the ground 111. By the time this position has been reached, the spacer sleeve 107 has reached the platform 14 and is bearing leftwardly thereagainst to bring the platform 14 closer to a vertical position. In this position, the operator need only exert a relatively small force to pull the platform 14 leftwardly (counter-clockwise in FIG. 5) through a dead centre position, so that the same can fall down to the broken-line position shown at 14' in FIG. 5, which is the operative position for the platform 14. In the latter position, the flipover plate 16 can be also rotated in the counter-clockwise direction as seen in FIG. 5, to bring it to an operative position, being that shown in FIG. 1.

We claim:

1. A tailgate loader for a vehicle, comprising:

upper arm means pivoted at one end to the rear of the vehicle at a first pivot location for swinging movement in a vertical plane, lower arm means pivoted at one end to the rear of the vehicle at a second pivot location spaced below the first pivot location, the lower arm means being mounted for swinging movement in a vertical plane, a platform mounted for pivotal motion about the other end of the upper arm means, the platform being capable of swinging between a stored position in which it overlies the upper arm means and an extended position in which it projects rearwardly from the said other end of the upper arm means, substantially vertical link means joining the other ends of the upper and lower arm means, thereby defining substantially a parallelogram mechanism, power means for swinging the arm means about their pivot locations at the rear of the vehicle, and an opener assembly for raising the platform from the stored position to a near-vertical position as the two arm means swing downwardly about their pivot locations, the opener assembly including (a) a first connecting link pivoted at one end to the upper arm means at a location spaced a first distance from said other end thereof, (b) a second connecting link pivoted at one end to the lower arm means at a location spaced a second distance from the other end of the lower arm means, said second distance being greater than said first distance, the other ends of the first and second connecting links being pivotally connected together to form a knuckle, whereby as the arm means are lowered, the knuckle moves away from the upper arm means, thus pressing on and moving the platform toward a vertical position, so that the operator need not exert great force to swing the platform to its extended position.

2. In a tailgate loader for a vehicle comprising a parallelogram linkage between the rear of the vehicle and a substantially vertical link adapted to be raised and lowered with respect to the vehicle as power means alter the length of a diagonal of the parallelogram linkage, the loader including a platform mounted for pivotal movement about the vertical link between a stored position in which it overlies the parallelogram linkage and an extended position in which it projects rearwardly from the linkage, the linkage having upper and lower arms, the improvement which comprises an opener assembly for raising the platform from the stored position to a near-vertical position as the parallelogram linkage swings downwardly, the opener assembly including:

(a) a first connecting link pivoted at one end to said upper arm at a location spaced a first distance from the rear end of the upper arm, (b) a second connecting link pivoted at one end to said lower arm at a location spaced a second distance from the rear end of the lower arm, the second distance being greater than the first distance, the other ends of the connecting links being pivotally connected together to form a knuckle, whereby as the parallelogram linkage is lowered, the knuckle moves the platform toward a vertical position, so that the operator need not exert great force to swing the platform to its extended position.

3. The invention claimed in claim 1, in which the upper arm means includes two similar upper arms, each bent adjacent the rear thereof, to define a V-shape with the apex downwardly, thereby providing a recess in which the platform in its stored position can be received.

4. The invention claimed in claim 1 or claim 3, in which the platform is substantially wider than the upper and lower arm means.

5. The invention claimed in claim 1 or claim 3, in which the second connecting link is longer than the first connecting link.

6. The invention claimed in claim 1 or claim 3, in which the second connecting link is about two times longer than the first connecting link.

7. The invention claimed in claim 3, in which there are two first connecting links each pivoted to one of the upper arms adjacent the apex of the V-shape thereof, and in which the second connecting link is about two times longer than the first connecting link, the first connecting link being adapted to swing between (a) a first position oblique to the lower arm means when the upper arms are raised, and (b) a second position substantially normal to the lower arm means when the upper arms are lowered.

8. The invention claimed in claim 7, in which the lower arm means includes two similar lower arms aligned with the upper arms.

9. The invention claimed in claim 1 or claim 2, in which torsion spring means are provided to urge the platform upwardly from its extended position.

* * * * *